Patented Aug. 29, 1933

1,924,129

UNITED STATES PATENT OFFICE 1,924,129

SEPARATION OF IRON AND CHROMIUM CHLORIDES

John C. Michalek, Niagara Falls, N. Y., assignor to The Mathieson Alkali Works, New York, N. Y., a Corporation of Virginia No Drawing. Application March 30, 1929, Serial No. 351,457. Renewed December 19, 1932

5 Claims. (Cl. 23—87)

This invention relates to improvements in the production of chromic chloride and more particularly to improvements in the production of iron-free chromic chloride from a mixture of chromous chloride and ferrous chloride.

The mixture of chromous and ferrous chlorides may be, for example, a fused mixture which is allowed to solidify and then crushed and ground in preparation for treatment of the mixture of salts according to the present invention to separate the ferrous chloride and produce chromic chloride.

My invention makes use of the fact that basic chromic chloride solutions have no tendency to crystallize. According to my process the crushed mixture of chromous and ferrous chloride is added to a quantity of water, for example, equal in weight to the crushed salt. More or less water may of course be used, depending on how much water the hydroscopic salt absorbs but the above proportion is usually found best. The material is not at once completely soluble in that amount of water, but by blowing air into the solution at a slightly elevated temperature, for example, 80 to 100° C. the chromous chloride is oxidized to basic chromic chloride and, as the oxidation proceeds, all the salt dissolves since the basic chromic chloride is much more soluble than the chromous chloride. The aeration is continued until all the chromous chloride is oxidized to basic chromic chloride and all the iron remains in the form of ferrous chloride. This condition may be determined by measuring the oxidation potential of the solution. Aeration is then stopped and the solution is allowed to cool.

On standing and cooling, iron salts separate out as ferrous chloride tetrahydrate and may be removed, leaving a solution of basic chromic chloride saturated with respect to ferrous chloride. The precipitated salt may be separated, preferably by the use of a centrifuge. Some chromium salts may adhere to the separated ferrous chloride and may be recovered by washing the latter with a small quantity of water. The resulting washings may be added to the filtrate and treated with it in the subsequent steps.

Other known methods of removing the crystals may be employed instead of the method described above and it is understood that the method of separation is not characteristic of my invention and I am not limited to any particular method. The preferable method, however, is separation by centrifuging although it may be accomplished less advantageously by filter pressing.

The precipitation and removal of the ferrous chloride increases the proportion of chromium in solution from a ratio of chromium to iron of two and one-half to one to a ratio of from ten to one to fifty to one. In this way, most of the iron is separated from the chromium.

The resulting solution, containing principally basic chromic chloride is treated with hydrogen chloride gas until the solution is no longer basic. Water is also added to maintain the quantity present above that required to form the hydrate of the salts present, to prevent the solution from becoming solid on cooling. A portion or all of the water added may be contained in the washings from the separation of the ferrous chloride described above and may be added as such. The water may also be added wholly or in part as concentrated hydrochloric acid and at the same time partially acidifying the solution so that less hydrogen chloride gas will be required.

When all the basic chromic chloride is neutralized the treatment with hydrogen chloride is stopped and the solution is allowed to stand and cool and crystals of chromic chloride-hexahydrate separate out. The cooling and separation may be continued as long as the concentration in mol percent of iron in the solution remains less than the concentration of iron in a eutectic solution of ferrous chloride and chromic chloride. This concentration is about twenty mol percent but the exact figure depends on conditions of temperature and acidity. If the separation is carried out further after the concentration of iron has reached that of iron in a eutectic solution of ferrous and chromic chlorides, the chromium product will be contaminated by ferrous chloride crystals. Large excesses of acid in the solution beyond the amount necessary to neutralize the basic chromic chloride do not interfere with the separation of chromic chloride hexahydrate from the solution.

The chromic chloride hexahydrate crystals may be separated by any known method and here again the method of separation is not characteristic of the process and the process is not limited to a particular method. However, centrifuging is the preferred method, although some other method such as filter pressing may be employed. Any chromium remaining in the filtrate may be removed by known methods.

The process of the present invention has the advantage that the temperature of the solution, as mentioned above, is maintained entirely by the heats of the reactions occurring so that no heat additions are required.

The present invention has the further advantage that the solubility and heat relations are such that it is possible, starting with a solid mixture of ferrous and chromous chloride, to separate the iron and recover the chromium as chromic chloride without any heating or evaporation steps.

I claim:—

1. The method for the production of chromic chloride which comprises treating a mixture of chromous and ferrous chlorides in the presence of water with air to cause the salt mixture to go into solution and the oxidation of the chromous chloride to basic chromic chloride, separating ferrous chloride by cooling, removing the separated ferrous chloride from the solution, treating the remaining solution with hydrochloric acid and separating and removing the chromic chloride crystallizing on cooling.

2. The method for the separation of ferrous chloride from chromous chloride which comprises mixing the salts with a relatively small quantity of water, treating the mixture with air, allowing the resulting solution to cool, and collecting the ferrous chloride crystals which separate therefrom.

3. The method for the separation of ferrous chloride from chromous chloride which comprises mixing the salts with an approximately equal weight of water, treating the mixture with air, allowing the resulting solution to cool and collecting the ferrous chloride crystals which separate therefrom.

4. The method for the separation of chromium chlorides from iron chlorides in a mixture containing ferrous and chromous chloride which comprises subjecting the solution containing the same to the action of oxygen to convert the chromous chloride to basic chromic chloride, separating a large proportion of the ferrous chloride from the mixture by precipitating the ferrous chloride and then separating the precipitate from the resulting solution, treating the basic chromic chloride with hydrogen chloride to form chromic chloride, and separating a large proportion of the latter from the mixture by utilizing its relative insolubility.

5. The method for the production of chromic chloride which comprises grinding up a fused mass containing a mixture of chromous and ferrous chlorides, mixing the ground material with a relatively small quantity of water, treating the mixture with air, allowing the resulting solution to cool, removing the resulting precipitate of ferrous chloride, treating the resulting solution with water and hydrogen chloride, allowing the solution to cool, and collecting the crystals of chromic chloride formed.

JOHN C. MICHALEK.